UNITED STATES PATENT OFFICE.

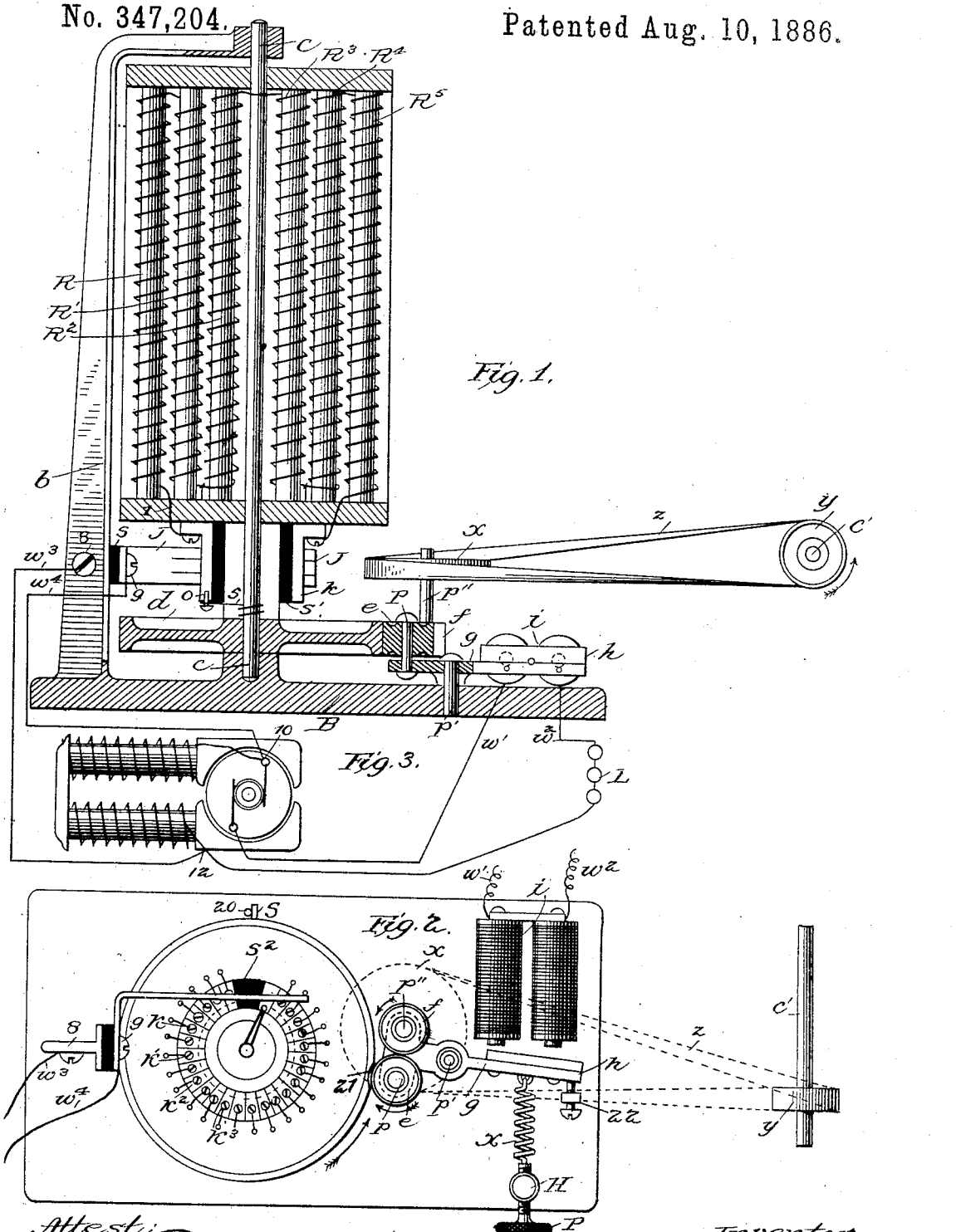

SIDNEY H. SHORT, OF DENVER, COLORADO, ASSIGNOR TO THE UNITED STATES ELECTRIC COMPANY, OF SAME PLACE.

REGULATOR FOR DYNAMO-ELECTRIC MACHINES.

SPECIFICATION forming part of Letters Patent No. 347,204, dated August 10, 1886.

Application filed September 22, 1885. Serial No. 177,858. (No model.)

*To all whom it may concern:*

Be it known that I, SIDNEY H. SHORT, of Denver, in the county of Arapahoe and State of Colorado, have invented a new and useful Improvement in Current-Regulators for Dynamo-Electric Machines; and I do hereby declare that the following is a full, clear, and exact description of the same.

My invention relates to a device for regulating the current developed and the energy consumed by a dynamo-electric machine.

The object of the invention is to connect with the terminals of the field-magnet wire of the dynamo an automatic shunting device which will regulate the amount of current flowing through the field-magnets, thereby regulating the electro-motive force of the dynamo, and also the current flowing through the external resistance.

Referring to the accompanying drawings, Figure 1 is a vertical section. Fig. 2 is a plan. Fig. 3 is a dynamo-electric machine, showing its connection with the regulator and external circuit.

In Fig. 1, B is the base of the regulator, with its standard $b$. Through the upper end of this standard passes a vertical shaft, $c$, its lower end extending down and having its bearings in the base B. This shaft can rotate easily in a horizontal plane. This shaft carries near its lower extremity a friction or gear wheel, $d$, which is firmly fastened to the shaft $c$, so that when the wheel $d$ is made to rotate the shaft will also rotate on its axis. Just above this wheel is shown an ordinary Gramme commutator having its segments $o$ $k$ mounted on an insulating-cylinder, $s'$, which is also carried on the shaft. A single brush, $j$, is made to press against this commutator, and is supported on an insulating-block, $s$, which is firmly fastened to the standard $b$. Above the commutator, and carried on the same shaft $c$, is a drum or receptacle of convenient form, arranged to carry resistance-coils R, R', R$^2$, R$^3$, R$^4$, and R$^5$. These coils are normally connected in series, as shown. One end of the series has a wire, 1, connected to the commutator-segment $o$. This segment is in turn connected with the shaft $c$ by means of a short wire, 5.

At various places in the series of resistance-coils wires 2, 3, 4, &c., are carried out to the various commutator-segments $K$, $K'$, $K^2$, $K^3$, &c. Now, if the wires $w^3$ and $w^4$ be connected, respectively, to the frame and the brush $j$, by means of the screws 8 and 9, and these wires be connected with the terminals of the field-magnet wires of the dynamo, as shown at 10 and 12 in Fig. 3, and if the shaft $c$ be turned until the brush $j$ is in contact with the commutator-segment $o$, the field-magnets will be short-circuited through the wires $w^3$ and $w^4$, the frame of the regulator, the wire 5, the commutator-segment $o$, and the brush $j$. If, however, the shaft be turned from this position, so that the brush $j$ is in contact with other commutator-segments, more and more of the resistance-coils may be thrown into the shunt, until, if it be turned through nearly one revolution, the brush $j$ is brought in contact with the non-conducting segment of the commutator, as shown at $s^2$ in Fig. 2, which throws the shunt entirely out from the field-magnets of the dynamo, and allows the dynamo to develop its maximum electro-motive force.

It will be easily seen by one familiar with the art that in a current-regulator such as described, it will be necessary to have the shaft $c$ made to rotate in one direction when the external current is insufficient and in the opposite direction when too great. In the first case it would be necessary to increase the resistance in the field-magnet shunt, and in the latter case to decrease it. In order to accomplish this, the main current from the dynamo is caused to pass through an electro-magnet, $i$, Fig. 2. The terminals of the wire of this electro-magnet are shown at $w'$ and $w^2$, and in Fig. 1 the external circuit is shown completed through the electric receptive device at L, which may be electric lamps or motors. This electro-magnet is made to actuate an armature, $h$, in opposition to a spring, X, the tension of which may be adjusted by the screw P, which is supported in a post, H. When the current through this magnet is sufficiently strong, it will overcome the tension of the spring X and move the armature $h$ to a contact with its poles. When, however, the current diminishes below a certain quantity, the spring X will overcome the force of the magnet and will move to its former position. The armature $h$ is carried on one end of a lever, $g$, which is pivoted on the axis $p'$. The other end of the lever is broadened out to carry two friction or gear wheels, $f$ and $e$, which are supported by and rotate freely about the axes $p$ and $p''$. These two wheels are always geared together, so that when one rotates in one direction the other moves in the opposite direction. One of these wheels is caused to rotate constantly by having attached to its shaft a belt-wheel, $x$, which is connected by means of a belt, $z$, with another belt wheel or pulley, $y$, which is carried on a shaft, $c$, which may be the dynamo-shaft or any convenient source of power. It is now easy to see that if the gear-wheel $f$, Fig. 2, is made to rotate constantly in the direction of the arrow, and its motion is communicated through the second gear-wheel $e$ to the large gear-wheel $d$ the commutator and resistance-coils will be moved around in the direction of the large arrow, throwing more and more resistance into the shunt, until the electro-motive force of the dynamo shall be sufficient to send enough current through the external circuit and the electro-magnet $i$ to move the armature $h$ toward it, thus removing the wheel $e$ from the wheel $d$, when it will cease to rotate. Should the current increase in quantity through the electro-magnet $i$ and make a further movement of the armature $h$ toward its poles, so that the wheel $f$ is in contact with the wheel $d$, then it will cause the armature and resistance-coils to move in the opposite direction, thereby increasing the resistance in the shunt and making a corresponding decrease in the electro-motive force of the dynamo.

It will be understood that I do not confine myself to this particular construction of the regulator, but any other arrangement of the parts which will accomplish the same result may be made use of. In some cases it is desirable to throw the shunt entirely out from the field-magnets of the generator and allow the current to decrease below its normal quantity and the regulator-shunt still remain out of circuit. This is desirable when the generator is furnishing the current for an electric railway system or a system of electric motors, or when the reverse electro-motive force of the motors approaches that of the generators, in which condition this system is working with the greatest efficiency. A stop, S, has therefore been provided, as shown in Fig. 2, so that when the wheel $e$, under the influence of the tension of the spring X, has caused the large wheel $d$ to move to a position where the brush $j$ rests on the non-conducting segment of the commutator $s^2$ it can move no farther, for the stop S is against the pin 20 in the frame. There is also provided a hollow place in the periphery of the wheel, as shown at 21, in order that when the stop S reaches the pin 20 the wheel $e$ will no longer be against the face of the wheel $d$, it being prevented from dropping into the hollow place by the stop-screw at 22. As soon as the current shall have increased sufficiently to pull the armature $h$ to the poles of the electro-magnet $i$ the wheel $f$ will be pressed against the periphery of the wheel $d$ and the shunt again made to come into action. In this way the quantity of the current can never exceed a certain fixed limit determined by the tension of the spring X.

I claim as my invention—

1. In combination with an electric generator, a movable series of connected resistance-coils, one end of said series connected directly to one of the terminals of the field-magnet wires of the generator, the other end and intermediate points of said series being connected to the various commutator-segments carried with the movable series of resistance-coils, and through the brush to the other terminal of the field-magnet wire, and mechanism regulated by the current for moving said series of resistance-coils, all substantially as described.

2. In combination with an electric generator, a series of resistance-coils carried on a revolving shaft, a commutator revolving with said shaft, and provided with an insulating-segment and with short-circuiting segments, connection between one end of the series of resistance-coils and one terminal of the field-magnet wire of the generator through one section of the commutator, the other end of the resistance-coils and intermediate points being connected to the short-circuiting segments, and a brush connected to the other end of the field-magnet wire, whereby the variable resistance is located in a shunt around the field-magnet coils of the generator, substantially as and for the purpose set forth.

3. In a current-regulator operated and controlled by a current on the external circuit, a stop, S, the pin 20, the armature-lever $h$, the wheels $e$ and $f$, and the wheel $d$, having the hollow 21 in its periphery, substantially as described.

4. In combination, an electric generator, a series of connected resistance-coils carried in a revolving receptacle, with one end of the series of coils connected directly to one terminal of the field-magnet and the generator, the other end and intermediate points being connected at the other terminal through a commutator carried with the revolving case, an electro-magnet in the external circuit having its armature connected with a lever carrying a pair of wheels driven constantly in opposite directions, and adapted, by means of the electro-magnet, to be thrown into and out of connection with a wheel on the shaft carrying the resistance-coils, all substantially as described.

5. In combination, the electric generator D, the series of resistance-coils on the shaft C, a commutator on said shaft, the electric connections between the resistance-coils and the field-magnet coils of the generator, an electro-magnet, $i$, in the external circuit, with its armature on the lever $g$, the gear-wheels on the lever, with mechanism for rotating them in opposite directions, and the gear-wheel on the shaft of the resistance-coil, substantially as described.

In testimony whereof I have signed my name to this specification in the presence of two subscribing witnesses.

SIDNEY H. SHORT.

Witnesses:
WM. N. BYERS,
H. A. GRAY.